Figure 1:
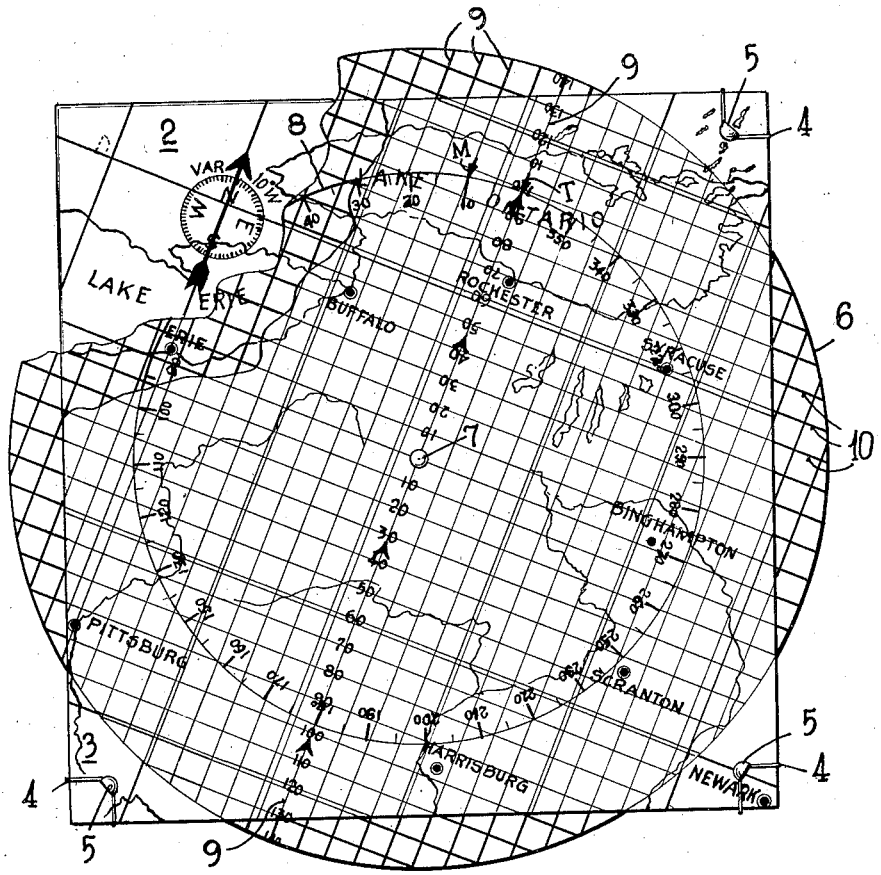

April 19, 1938.  P. DALTON  2,114,652

MAP HOLDER AND PLOTTING DEVICE

Filed Nov. 1, 1935  3 Sheets-Sheet 1

Inventor

Philip Dalton,

By F. Gerald Foy

Attorney

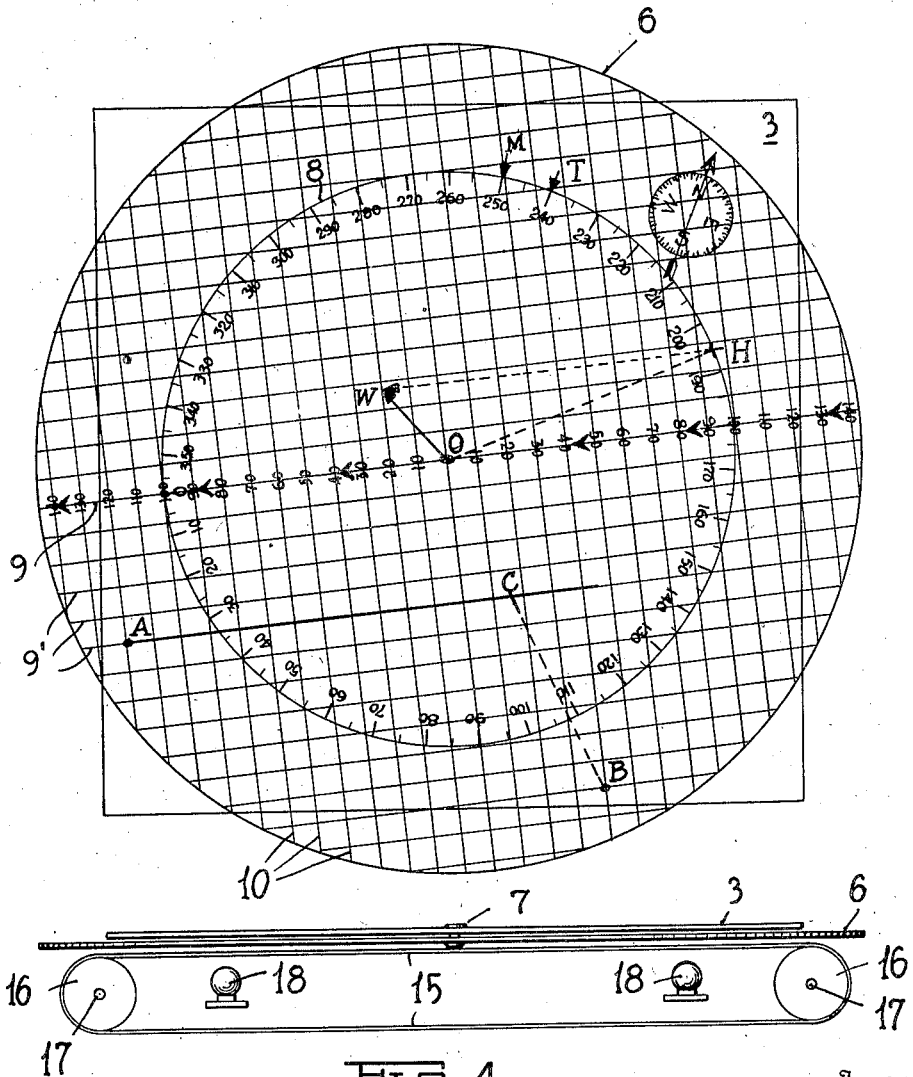

April 19, 1938.　　　　　P. DALTON　　　　　2,114,652
MAP HOLDER AND PLOTTING DEVICE
Filed Nov. 1, 1935　　　3 Sheets-Sheet 3
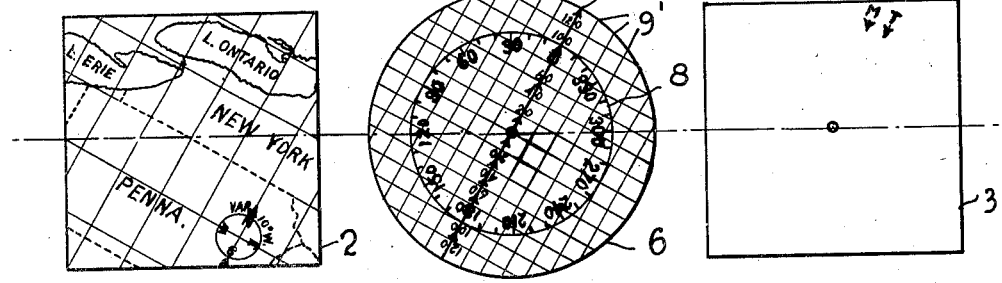
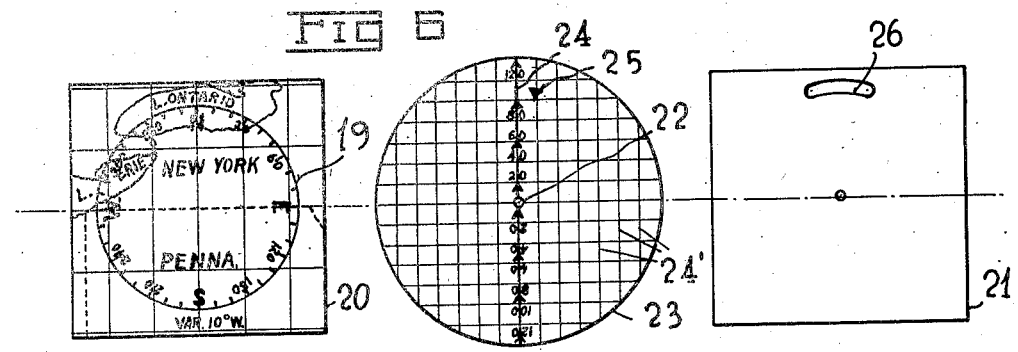
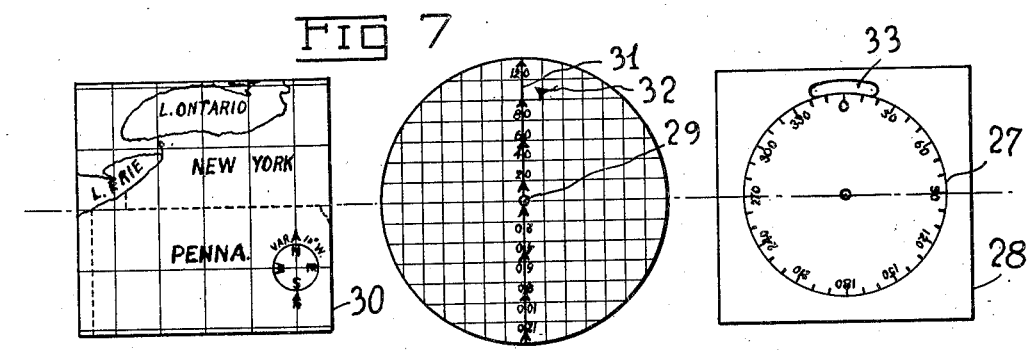
Inventor
Philip Dalton,
By F. Gerald Toye
Attorney Patented Apr. 19, 1938

2,114,652

UNITED STATES PATENT OFFICE 2,114,652

MAP HOLDER AND PLOTTING DEVICE

Philip Dalton, Washington, D. C.

Application November 1, 1935, Serial No. 47,882

17 Claims. (Cl. 33—1)

My invention relates to improvements in combined map holders and plotting devices.

It is desirable in the navigation of aircraft to use a map on which to plot courses and distances, radio compass bearings, astronomical lines of position, etc. The use of an ordinary chart table on which to do this work, using the well known protractors, rulers, dividers, etc., is difficult and inconvenient except in the larger planes. As a matter of fact, in any plane it is often advantageous and sometimes necessary for the pilot or co-pilot to do this work without leaving the controls. It is, therefore, an object of my invention to provide a simple, compact, durable and inexpensive map holder and plotting device which may be constructed without any loose parts other than a pencil so that it can be effectively used in the pilot's lap while he is in the control seat of an aeroplane.

Another object of my invention is to provide such a map holder which can be easily and quickly used to measure and plot directions and distances over a map as well as to solve the vector triangles encountered in aerial dead reckoning navigation.

A further object of my invention is to provide such a device with which it is easy to measure or plot directions over a map with reference to both true north and magnetic north.

Another object of my invention is to provide a map holder and plotting device which is adapted to use a wide variety of maps of different sizes and shapes without cutting or mutilating them.

In its preferred form my invention includes a transparent plotting sheet with a writing surface, and a second transparent sheet pivotally mounted beneath it. The second transparent sheet has a grid and a counter clockwise compass rose printed thereon, the counter clock-wise compass rose being concentric with the pivotal point. This assembly is in turn securely mounted over a base member adapted to hold a map.

It will be understood that my invention is not only useful for aerial navigation but also for navigation in general, surveying, artillery plotting and reconnaissance, in fact for any plotting problem wherein considerations of space, weight, ease of carrying, manipulation, etc., make it impractical to use the ordinary chart holder or plane table together with the usual accessories.

My invention will be better understood from the following description taken in connection with the accompanying drawings, and the features of novelty which characterize the same will be pointed out with particularity in the claims annexed to and forming a part of this specification.

Figure 2:
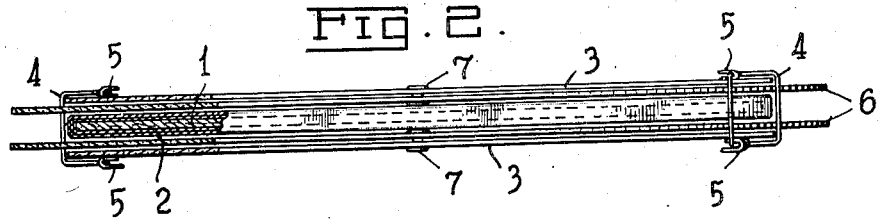

Referring to the drawings, Figure 1 is a plan view of my map holder plotting device partly broken away to show the different members. Figure 2 is an expanded side elevation partly in section showing how the device is assembled. Figure 3 is a diagram illustrating the use of my invention to solve well known problems in aerial navigation. Figure 4 is a diagrammatic side elevation showing a modification arranged for use at night. Figs. 5, 6, and 7 show the component parts of the preferred form and two modifications respectively.

Referring to Figs. 1, 2 and 5, the preferred embodiment of my invention consists of a flat, square base piece 1 around which a standard scale aviation map 2 is folded in such a manner that the two adjacent square areas in which it is desired to navigate appear on opposite sides of the base piece 1. The base piece 1 may be fashioned of any suitable material, such for example as plywood. By folding the map around this base piece 1 it is possible to fold underneath, areas of a standard airway map which are not being used without cutting or damaging the map. Secured on each side of the base piece 1 which has the map folded therearound, are square pieces of celluloid 3, hereafter referred to as plotting sheets, substantially the same size as the base piece 1. These pieces of celluloid are so treated on their upper sides as to present plotting surfaces upon which pencil marks may be easily made and erased. The plotting sheets 3 are secured to each other on opposite sides of the base piece 1 by means of rubber bands 4 secured to hooks 5 on each corner of each of the plotting sheets 3.

It will be understood, of course, that any suitable fastening means may be used. With the arrangement shown the rubber band fastening means accomplishes the function of positioning each of the plotting sheets 3 with respect to the base piece 1 and map 2 during use, as well as the function of holding the component parts together. Further, it enables one to unfasten two corners of the plotting sheets and open them up to remove the base piece 1 and map 2, the two remaining rubber bands forming a hinge during this operation.

A transparent grid disc or protractor sheet 6 is rotatably mounted between each of the plotting sheets 3 and the map 2. This rotatable mounting is achieved by means of pivot 7 securing the center points of grid discs 6 to the center points of plotting sheets 3. Each of these grid discs 6 is larger in diameter than its associated plotting sheet 3 so that the edge thereof extends beyond plotting sheet 3. This arrangement makes it possible to easily manipulate grid discs 6 and rotate them to any position desired. Each of the grid discs 6 has delineated thereon a circle 8 concentric with the pivotal point. This circle 8 is made on a radius of 100 miles to the scale of the map with which the device is to be used and is divided into a reversed or counter-clockwise compass rose. A diametric line 9 extends through the 0°-180° or north-south points of the compass rose with arrows pointing in the direction of 0°. This line 9 is divided into two radial scales of miles having their origins at the pivotal point. A series of lines 9' is delineated over the entire surface of the grid disc 6, said lines being parallel to diametric line 9 and spaced apart by a distance equivalent to ten miles based on the above referred to scale of miles. A second series of lines 10 is delineated on grid disc 6 at right angles to diametric line 9, said lines being likewise spaced every ten miles in accordance with the scale of miles. These two series of lines 9' and 10 respectively form a grid laid out in accordance with the scale of the map being used.

Index T pencil-marked on plotting sheet 3 indicates true north in accordance with one of the meridians on map 2. Index M, likewise pencil-marked on plotting sheet 3, indicates magnetic north in accordance with the indication on map 2 that the magnetic variation for the area shown is 10° west.

Lines 9' used in conjunction with the compass rose 8 and pencil marked indices T and M provide a means for plotting freehand on one of the plotting sheets 3, the direction between any two points on map 2. At the same time, lines 10 provide a means for measuring the distance between such two points.

The manner of using my invention will be well understood to those familiar with the art of aerial navigation from a consideration of Fig. 3. This figure illustrates the method for solving the wind drift problem to make good a course C—A, C and A being selected points on map 2.

The first step in the use of my invention after it has been assembled with the proper map areas showing beneath the plotting sheet 3 is to pencil-mark, the true north index T on plotting sheet 3 directly over the circle 8 on grid disc 6. This is done by orienting one of the lines 9' parallel to one of the meridian lines found on all navigational maps. The diametric line 9 then points to true north and index T can be indicated by a pencil-marked arrow. The next step is to pencil-mark the magnetic index M on plotting sheet 3. This is accomplished with the aid of the graduations on circle 8 to measure off the angle of variation in accordance with data given on the map. With maps having non-parallel meridians or showing areas where the magnetic variation changes rapidly, these pencil-marked indices are changed to conform to the directions of true north and magnetic north for the particular area of the map with which the navigator is concerned.

The radius of the compass rose circle 8 is one hundred on the radial grid scales along line 9. Therefore, when any heading and air speed vector such as H—O in Fig. 3 is plotted from the circle to the pivot center O the grid scale divisions will represent percentages of the air speed. Further, a wind vector such as O—W and a track and ground speed vector such as H—W can be plotted to scale as percentages of the air speed. Thus, a complete drift triangle such as H—O—W can be solved with the lengths of the three vectors represented as percentages of air speed.

In order to solve a specific problem such as the wind drift triangle for the desired course C—A the wind vector O—W is first plotted to scale as a percentage of air speed. This may be done by the use of aerological data or by solving two drift triangles in each of which the heading and air speed and angle of drift are known as well as by other methods well understood in the art. Then with the diametric line 9 oriented parallel to the desired course C—A as shown in Fig. 3 the track and ground speed vector H—W is plotted backwards freehand from the wind point W by the aid of the parallel lines 9' until it intersects the compass rose circle 8 at H. The ground speed thus obtained is a percentage of air speed and can be read by noting the length of vector H—W using for this purpose the grid squares, each one of which represents 10 per cent of air speed. By multiplying this percentage times the air speed which is known, the ground speed in miles per hour can be obtained. The magnetic heading necessary to make good the specified course C—A can then be determined by orienting the diametric line 9 under vector H—O with the arrows on the scalar line 9 pointing in the direction H—O and reading the direction at the pencil-marked magnetic index M.

Another problem, the determination of position by the intersection of two radio compass bearings is also shown in Fig. 3. Assume A represents the map position of a radio station at the destination and the line C—A is a radio compass bearing 250° magnetic obtained while the plane is at an unknown position in the vicinity of C. The line C—A is plotted by setting 250° at index M. This fixes the position of the plane somewhere along line C—A. The line C—B similarly plotted from a radio compass bearing taken on station B fixes the position of the plane at point C, the intersection of the two lines A—C and B—C.

The method of measuring distances as described above is based on the use of a grid scale equal to the scale of miles on the map. Aviation maps are constructed on scales which are convenient multiplies or fractions of the scale of 1/1,000,000. Thus, it can be seen that if it is desired to use maps of different scales a grid construction on the scale of 1/1,000,000 can still be used to measure distances by the use of a suitable factor.

If desired my invention may be arranged as illustrated in Fig. 4, wherein I have shown an endless strip map 15 mounted on rollers 16. These rollers 16 are adapted to be turned on shafts 17 by knobs, not shown, so as to bring the desired area of the map on the upper side. Over this strip map 15 is mounted a plotting sheet 3 and grid disc 6 as described in connection with Figs. 1 and 2. Underneath the upper part of strip map 15 lighting means such as a plurality of electric lights 18 are mounted so as to cause a diffused light to be visible down through the plotting sheet 3, grid disc 6 and map 15. This arrangement renders the details of the map and the plottings on sheet 3 easily discernable in the semi-darkness desirable in the control room of an airplane being navigated at night. Further, it is a simple matter to move a new section of map into position and in cases where a map is used which unrolls off of one roll and rolls up on the other this operation of bringing a new section into position can be repeated as long as any of the map remains.

While I have referred to plotting sheet 3 and grid disc 6 as being made up of celluloid, it will be understood that any other suitable transparent material falls within the scope of my invention. It will be further understood that while I have shown lines 9' and 10 forming a grid, lines 10 are not entirely necessary since it is possible to rotate the grid disc 90° and use lines 9' to measure distances.

Figs. 5, 6 and 7, which show the component parts of the preferred form and two modifications of my invention respectively, illustrate various means for orienting grid discs with respect to maps. Fig. 5 shows the preferred form in which true index T and magnetic index M are pencil-marked on plotting sheet 3 for use with the counterclockwise compass rose 8 on grid disc 6 to measure angular orientations of grid lines 9' with respect to true and magnetic north on map 2, as described above.

In the modification shown in Fig. 6 the compass rose 19 is located on the map and the true and magnetic indices are placed on the grid disc. Compass rose 19 on map 20 is on a radius of one hundred miles to scale and is an ordinary or clockwise compass rose in proper orientation with respect to true north on the map. Map 20 is arranged so that when it is secured under plotting sheet 21 the compass rose 19 will be concentric with pivot 22 of the grid disc 23. The diametric scalor line 24 of the grid disc 23 coacting with the compass rose 19 will then serve as a true index for measuring angular orientations of grid lines 24' with respect to true north on the map. Likewise, a magnetic index 25 pencil-marked on the grid disc beside true index 24 through an opening 26 in the plotting sheet 21 will serve to measure orientations of the grid lines with respect to magnetic north on the map.

In the modification shown in Fig. 7 the compass rose 27 on a radius one hundred miles to the scale of map 30 is located on plotting sheet 28 concentric with grid disc pivot 29. Map 30 is arranged so that when secured to plotting sheet 28 the direction of true north on the map will coincide with the direction of 0° on the compass rose 27. The scalor line 31 will then serve as a true index. And a magnetic index 32 may be pencil-marked on the grid disc through opening 33 in the plotting sheet as in the modification described above.

While I have described what I consider to be the preferred embodiments of my invention, it will, of course, be understood that I do not wish to be limited thereto since many other modifications may be made in the structure, and I contemplate by the appended claims to cover all such modifications as fall within the true spirit and scope of my invention.

What I claim as new and desire to secure by Letters Patent is:

1. A map holder and plotting device comprising a map support, a transparent plotting member, means for securing said member in fixed orientation and fixed position over said map support, a second transparent member mounted for rotation between said transparent plotting member and said map support, said second transparent member having a series of parallel lines delineated thereon, and means for setting said second transparent member in desired angular orientation with respect to said map support.

2. A map holder and plotting device comprising a map support, a transparent plotting member, means for securing said member in fixed orientation and fixed position over said map support, a second transparent member mounted for rotation between said transparent plotting member and said map support, said second transparent member having a series of parallel lines delineated thereon, and a compass rose on one of said transparent members concentric with the axis of rotation of said second transparent member.

3. A map holder and plotting device comprising a map support, a transparent plotting member, means for securing said member in fixed orientation and fixed position over said map support, a second transparent member mounted for rotation between said transparent plotting member and said map support, said second transparent member carrying a compass rose, and having a series of parallel lines delineated thereon.

4. A map holder and plotting device comprising a map support, a superposed transparent plotting member, a transparent protractor member having a series of parallel lines delineated thereon and being mounted for rotation between said superposed member and said map support, and means for securing said superposed member to said map support in fixed relation with respect thereto.

5. A map holder and plotting device comprising a map support, a transparent plotting member mounted over said map support, an interposed transparent protractor member having a series of parallel lines delineated thereon and mounted for rotation between said transparent plotting member and said map support, and means for securing said transparent plotting member to said map support, said means including means for positioning said map support in fixed relation with respect to said transparent plotting member.

6. A map holder and plotting device comprising a member having a map represented thereon, a transparent plotting member mounted over said first mentioned member, a circular transparent protractor member pivotally mounted underneath said transparent plotting member and over said first mentioned member, said circular transparent protractor member being arranged to protrude beyond the edge of said first mentioned member and the superposed transparent plotting member whereby said protractor member may be manipulated manually to orient the same.

7. A map holder and plotting device comprising a map support adapted to have a map folded therearound, a transparent plotting member mounted on each side of said map support, a rotatable transparent protractor member mounted between each of said first referred to transparent members and said map support, securing means adjacent to at least one edge of one of said transparent plotting members, securing means correspondingly located on the other of said transparent plotting members and elastic means extending between corresponding securing means on said members to secure said members to one another on opposite sides of said map support.

8. A map holder and plotting device comprising a map support adapted to have a map folded therearound, a transparent plotting member mounted on each side of said map support, a rotatable transparent protractor member mounted between each of said transparent plotting members and said map support, a hook located at each corner of each of said transparent plotting members and flexible means securing together corresponding hooks on opposite members, said flexible means being so arranged around the corners of said transparent plotting members as to position said map support and map with respect thereto.

9. A map holder and plotting device comprising a map support, a transparent plotting member mounted over said map support, a transparent protractor member pivotally mounted between said transparent plotting member and said map support, said transparent protractor member being of such dimensions that the edge thereof protrudes beyond one edge of said map support whereby said protractor member may be manipulated manually to orient the same.

10. A map holder and plotting device comprising a map support, a transparent plotting member mounted over said map support, a transparent protractor member pivotally mounted between said transparent plotting member and said map support, said transparent protractor member being of such dimensions that the edge thereof protrudes beyond the edge of said transparent plotting member whereby said protractor member may be manipulated manually to orient the same.

11. A map holder and plotting device comprising a member having a map represented thereon, a transparent plotting member, means for securing said plotting member in fixed orientation and fixed position over said first mentioned member, a second transparent member mounted for rotation between said transparent plotting member and said first mentioned member, said second transparent member having delineated thereon a series of parallel lines and means for setting said second transparent member in desired angular orientation with respect to said first mentioned member.

12. A map holder and plotting device comprising a member having a map represented thereon, a transparent plotting member, means for securing said plotting member in fixed orientation and fixed position over said first mentioned member, a second transparent member mounted for rotation between said transparent plotting member and said first mentioned member, said second transparent member having delineated thereon a diametric line and a series of lines parallel thereto, a circle being delineated on one of said members, concentric with the axis of rotation of said second transparent member and means for setting said second transparent member in desired angular orientation with respect to said first mentioned member.

13. A map holder and plotting device comprising a member having a map represented thereon, a transparent plotting member, means for securing said plotting member in fixed orientation and fixed position over said first mentioned member, a transparent grid member mounted for rotation between said transparent plotting member and said first mentioned member, one of said members having a compass rose thereon concentric with the axis of rotation of said transparent grid member.

14. A map holder and plotting device comprising a member having a map represented thereon, a transparent plotting member, means for securing said plotting member in fixed orientation and fixed position over said first mentioned member, a transparent grid member mounted for rotation between said transparent plotting member and said first mentioned member, said transparent grid member having a compass rose thereon concentric with the axis of rotation thereof.

15. A map holder and plotting device comprising a member having a map represented thereon, a transparent plotting member, mounted over said first mentioned member, a transparent grid member mounted for rotation between said transparent plotting member and said first mentioned member, said transparent plotting member having a compass rose thereon concentric with the axis of rotation of said transparent grid member, said compass rose being oriented to correspond to the orientation of said map.

16. A map holder and plotting device comprising a member having a map represented thereon, a transparent plotting member, means for securing said plotting member in fixed orientation and fixed position over said first mentioned member, a transparent grid member mounted for rotation between said transparent plotting member and said first mentioned member, said map having a compass rose thereon concentric with the axis of rotation of said transparent grid member.

17. A map holder and plotting device comprising a member having a map represented on either side thereof, a transparent plotting member mounted on each side of said first mentioned member, a rotatable transparent protractor member mounted between each of said transparent plotting members and said first mentioned member, and means for securing said transparent plotting members in fixed orientation and fixed position with respect to said first mentioned member including a hook located at corresponding corners of each of said transparent plotting members and flexible means securing said hooks together, said flexible means being so arranged around the corners of said transparent plotting members as to position said first mentioned member with respect to said transparent plotting members.

PHILIP DALTON.